June 16, 1936.　　M. E. MITCHELL ET AL　　2,044,252
COUPLING
Filed April 16, 1934
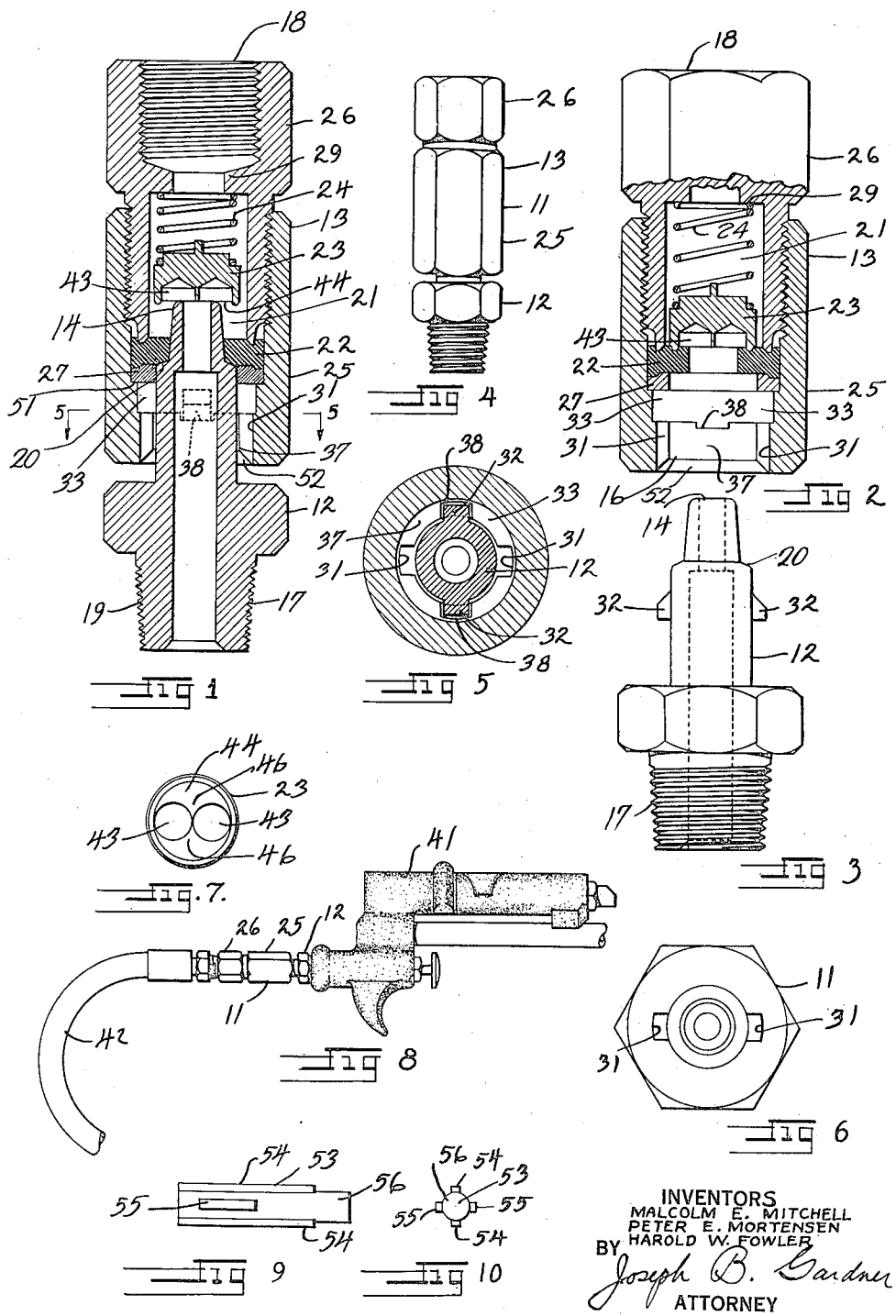
INVENTORS
MALCOLM E. MITCHELL
PETER E. MORTENSEN
HAROLD W. FOWLER
BY Joseph B. Gardner
ATTORNEY

Patented June 16, 1936

2,044,252

UNITED STATES PATENT OFFICE 2,044,252

COUPLING

Malcolm E. Mitchell, Peter E. Mortensen, and Harold W. Fowler, Oakland, Calif.; said Mitchell assignor to said Mortensen and said Fowler Application April 16, 1934, Serial No. 720,760

3 Claims. (Cl. 284—19)

The invention relates to coupling members such as used to readily attach and detach sections or extensions of a fluid circuit and more particularly to the type of coupling used in connection with air pressure systems.

An object of the invention is to provide a coupling of the character described which will be constructed in a manner concealing the means of detachment of the coupling sections and thereby render surreptitious removal of any portion of the air line substantially impossible without detection thereof by the attendant in charge of the apparatus.

Another object of the invention is to provide a coupling of the character described which will be positively locked in coupled position against forceful twisting of the sections or forced separation other than in the concealed method of detachment above referred to.

A further object of the invention is to provide a coupling of the character described in which the parts thereof will be particularly arranged in a manner affording the integral formation of certain parts heretofore of separate construction and subject to loosening and consequent leakage, whereby the coupling of our invention will be simpler and sturdier in construction and capable of withstanding long and rugged usage without impairing its usefulness or incurring leakage.

Still another object of the invention is to provide a coupling of the character described having an improved valve construction which while providing for a bearing area of the engaged parts at least equal to that heretofore obtainable, permits of a considerably increased flow of fluid through the coupling.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of a coupling constructed in accordance with our invention with the separate sections thereof attached.

Figures 2 and 3 are sectional and side views of the coupling sections shown in detached position.

Figure 4 is a side elevation of the coupling with the sections attached.

Figure 5 is a sectional view through the coupling taken substantially on the plane of the line 5—5 of Figure 1.

Figure 6 is an end view of the coupling section shown in Figure 2.

Figure 7 is an elevational view of the valve face used in the coupling.

Figure 8 is a side view showing the use of the coupling in connection with a common type of air inflator apparatus.

Figures 9 and 10 are side and end views of a tool used in the construction of one of the coupling members.

With reference to the drawing, the coupling 11 of our invention comprises detachable male and female sections 12 and 13 which are arranged for telescopic engagement at their ends 14 and 16 and are preferably threaded at their opposite ends 17 and 18 to facilitate the connection of the sections to a fluid line. Extending longitudinally through the sections are aligned bores 19 and 21 for conveying fluid through the coupling. Means for sealing the sections against leakage when coupled, here comprises a packing washer 22 which is mounted in the bore 21 and arranged to engage about the end 14 of the male member, the latter being preferably formed with a slight taper to afford a wedged engagement with the washer, and also being formed with an annular shoulder 20 for supporting the washer against the fluid flow and pressure. The washer further serves with the members detached as a seat for a valve 23 which is mounted for axial movement in the bore 21 and is normally urged by a spring 24 to seat against the washer in passage closing position and is displaceable from such position only by and upon insertion of the male end 14 through the washer. As here shown the female section is comprised of two parts including a main body casing 25 and a hollow end plug 26 therefor which defines the aforesaid engageable outer end 18 of the section and which extends centrally into the casing 25 for clamping the washer 22 in position against a retaining ring 27. Preferably formed integrally with the member 26 and extending into the passage 21 in spaced relation to the washer 22 is an annular shoulder 29 which defines with the latter a chamber for the valve 23 and affords in addition a support for the outer end of the valve spring 24.

Thus with the members detached the valve will be urged both by the fluid flow and by the spring 24 into passage closing position against the packing washer to prevent leakage from the fluid from the female section. On the other hand upon attachment of the sections, the end 14 of the male member will engage and displace the valve to place the bores of the sections in communication, while at the same time the end 14 will be seated in the washer to prevent leakage from the male section.

In general it has been customary in coupling members of the type to which ours is related to connect the detachable sections of the coupling by means of a bayonet connection, a species of which is also here used, and in this regard it may be mentioned that these prior couplings have in addition included in one form or another several of the elements above described. It may therefore be understood that the present invention relates to a large extent to the improved form of such elements and the consequent enhanced functioning of the device rather than to the elements broadly as a new combination.

Heretofore the connection between the sections usually included a transverse pin or the like carried by the male section and which engaged in a bayonet slot in the female section so that on drawing the sections together and then twisting one relative to the other a fastening of the sections was effected. In this type of connection the pin was of circular section and as a result could be forcefully twisted from a seated position in the slot. Also the pin as a rule extended through the bore in the male section and in this way not only obstructed fluid flow but was a ready source of leakage should the pin become loosely held as a result of handling or rough usage. In accordance with the coupling of our invention, however, means of connection between the coupling member is so arranged as to entirely avoid possible disconnection of the sections or leakage in the manner aforesaid. In addition and as a particularly important and novel feature of the invention, the attachment means is arranged to completely conceal the manner of disassembly of the coupling so as to render the latter's disconnection by other than the method provided for practically impossible. This latter feature is carried out in the present invention by arranging the bayonet slot portion 31 of the connection entirely within the bore 21 at the end 16 of the female section and forming opposed slot engaging lugs or projections 32 on the interfitting end 14 of the male section, whereby with the sections attached both the slots and projections will be entirely concealed within the section 13. As here shown, the portion 31 consists of two diametrically opposed slots which extend from the open end of the bore 21 inwardly to an annular chamber 33. Thus upon insertion of the projections into the slots and effecting first a relative axial movement of the sections until the projections are moved to the chamber 33 and then effecting a relative rotary twist of the sections, the projections will be moved into locked engagement behind the outer shoulder 37 of the chamber. Retention of the projections in this latter position is here arranged to be effected by forming in the shoulder at diametrically opposed points intermediate the slots 31, a pair of sockets 38 arranged to receive and interlock with the projections. Since the insertion of the male section is resisted jointly by the spring 24 and the fluid flow and as a result the resisting force will be applied in drawing the projections against the shoulder when the same are engaged as aforesaid, the movement of the projections into the sockets when aligned and a resultant locking of the parts will be insured. As an important feature of our invention and serving to prevent twisting of the projections from the sockets, the latter are both formed of rectangular section so that no incline is available on the interengaged sides thereof for permitting a longitudinal disengaging movement incident to a forceful twisting of the projections and sockets. Thus with the members attached it is first necessary to move the sections toward each other to disengage the sockets and lugs and then rotate the sections to position the lugs opposite the slots 31 for ready withdrawal. When the coupling is attached as shown in Figures 1, 4, and 5, the sections are so closely associated with each other as to disguise this initial longitudinal movement and as will be clear no other manipulation of the coupling sections such as twsting or pulling will be productive of their disassociation.

As a further advantage of our construction the lugs are formed integrally with the male section 12 and as lateral extensions rising exclusively from the periphery of the end portion 14 of the section. In this manner the lugs in no way interfere with the passage of fluid through, or have any communication whatsoever with, the bore 19. As a result, loosening of the lugs is, by reason of their integral construction, impossible and inadvertent breaking of a lug cannot permit leakage.

A common use of couplings of this type is for connecting a tire inflator apparatus 41 such as shown in Figure 8 to the end of an air line 42 of a service station or the like. In the case of previous couplings available, attachment and detachment of the coupling sections were readily effected and the mode of quick disconnection was apparent at a glance. Accordingly the previous couplings permitted of ready unauthorized removal of the inflator apparatus and considerable loss was thereby incurred to the operator. The use of our coupling however for connecting the air line and inflator apparatus permits of ready detachment of the apparatus at the end of a days business and at the same time substantially eliminates the chance of surreptitious removal of the apparatus during business hours. Furthermore should the coupling be forced, such as with wrenches, the only part that may be released is the end plug of the female section which would immediately open the air line and thereby attract the attention of the operator.

In the design of our coupling we have also provided for an improved connection between the valve 23 and the end 14 of the male section for increasing the fluid flow through the coupling. As here shown in Figures 1, 2, and 7 the valve is provided with a pair of axially extending circular depressions 43 which are drilled into the valve face 44 in side by side relation and thereby afford a maximum of bearing space 46 about the depressions for engagement with the end 14 and at the same time effect a maximum opening between the bores 21 and 19.

A preferred method of construction of the female section casing 25 consists in first drilling axially through the member from the outer end 18 thereof with a drill diameter slightly larger than the male end 14, then reaming from the same end to define the shoulder 37, then tapping the reamed bore adjacent the end 18 to form internal threads for the hollow plug member 26 and at the same time defining a shoulder 51 for supporting of the washer retaining ring 27, and then from the same outer end punching out the slots 31 and indenting the sockets 38. Preferably following the punching operation, the opposite end 16 of the member is counter drilled as shown at 52 in Figures 1 and 2 in order to remove any bur or swelling incurred by the punching. This latter punching operation is preferably effected by means of a tool 53 shown in Figures 9 and 10 which includes opposed punching offsets 54 and 55 for forming the slots and sockets respectively and a center supporting portion 56 arranged to engage in and support the side walls of the center bore adjacent the end during the punching operation. We have found that the success of the punching operation is to a large extent dependent on the support to the walls of the section afforded by the portion 56.

We claim:

1. In a coupling of the character described, a female section comprising, a tubular member provided with an internal annular support, a compressible sealing washer mounted on said support, a second tubular member threaded longitudinally into the first and positioned within the inner end thereof bearing against and compressing said washer into sealed engagement jointly with said end and said support, a valve mounted in said second member and movable to and from a passage closing position on said washer, a tubular male section having an end insertible in said first member and extendable through said washer for displacing said valve therefrom and placing the passages of said male and female sections in communication, said male section end being tapered to provide a wedged engagement with said washer, and means for holding said male and female sections in attached position.

2. In a coupling of the character described a female section comprising, a tubular member provided with an internal annular support, a compressible sealing washer mounted on said support and engaging the inner wall of said member, a second tubular member threaded longitudinally into the first and positioned with the inner end thereof bearing against and compressing said washer into sealed engagement jointly with said end and said wall and said support, a valve mounted in said second member and movable to and from a sealed position on said washer, a tubular male section having an end insertable in an end of said first member opposite to said second member and engageable through said washer for displacing said valve therefrom for placing the passages of said male and female sections in communication, said male section end being tapered to provide a wedged engagement with said washer and having an annular shoulder for supporting said washer in sealed engagement with the periphery of said end and against the fluid flow in said female section, and means for holding said male and female sections in attached position.

3. In a coupling of the character described a female section comprising, a tubular member provided with an internal annular shoulder, a retaining ring mounted against said shoulder, a compressible sealing washer mounted on said ring, and engaging the inner wall of said member, a second tubular member threaded longitudinally into the first and positioned with the inner end thereof bearing against said washer so as to compress the same into sealed engagement jointly with said end and said wall and said ring, a valve mounted in said second member and movable to and from a sealed position on said washer, a tubular male section having an end insertable in an end of said first member opposite to said second member and engageable through said washer for displacing said valve therefrom for placing the passages of said male and female sections in communication, said male section end being tapered to provide a wedged engagement with said washer and having an annular shoulder for supporting said washer in sealed engagement with the periphery of said end and against the fluid flow in said female section, and means for holding said male and female sections in attached position.

MALCOLM E. MITCHELL.
PETER E. MORTENSEN.
HAROLD W. FOWLER.